(12) United States Patent
Qin et al.

(10) Patent No.: US 10,469,953 B2
(45) Date of Patent: *Nov. 5, 2019

(54) SPEAKER BOX

(71) Applicant: AAC Technologies Pte. Ltd., Singapore (SG)

(72) Inventors: Peng Qin, Shenzhen (CN); Shengrong Shi, Shenzhen (CN); Zhe Zhang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/856,908

(22) Filed: Dec. 28, 2017

(65) Prior Publication Data

US 2019/0014417 A1    Jan. 10, 2019

(30) Foreign Application Priority Data

Jul. 4, 2017    (CN) .......................... 2017 1 0537088

(51) Int. Cl.
*H04R 1/02*    (2006.01)
*H04R 9/06*    (2006.01)
*H04R 1/28*    (2006.01)
*H04R 1/34*    (2006.01)
*H04M 1/03*    (2006.01)

(52) U.S. Cl.
CPC .............. *H04R 9/06* (2013.01); *H04R 1/025* (2013.01); *H04R 1/2803* (2013.01); *H04R 1/283* (2013.01); *H04R 1/288* (2013.01); *H04R 1/345* (2013.01); *H04M 1/035* (2013.01); *H04R 2400/11* (2013.01); *H04R 2499/11* (2013.01)

(58) Field of Classification Search
CPC .......... H04R 1/02; H04R 1/023; H04R 1/025; H04R 1/2908; H04R 1/2834; H04R 1/345; H04R 2400/11; H04R 2499/11; H04R 1/2803; H04M 1/035
USPC ....... 381/338, 345, 350, 351, 353, 354, 357, 381/386, 391, 189; 181/145, 146, 199; 379/430
See application file for complete search history.

(56) References Cited

U.S. PATENT DOCUMENTS

| 4,058,688 A | * | 11/1977 | Nishimura | ........... | H04R 1/1008 |
| | | | | | 381/354 |
| 5,263,093 A | * | 11/1993 | Nakamura | ................ | H04R 9/08 |
| | | | | | 381/177 |
| 6,002,949 A | * | 12/1999 | Hawker | .............. | H04M 1/0202 |
| | | | | | 361/814 |

(Continued)

*Primary Examiner* — Huyen D Le
(74) *Attorney, Agent, or Firm* — IPro, PLLC; Na Xu

(57) ABSTRACT

A speaker box includes a housing; a speaker unit accommodated in the housing, the speaker unit including a diaphragm for vibration and sound producing; a front sound cavity formed cooperatively by the diaphragm and the housing; a sound guiding channel communicating the front sound cavity with external environment; a front cavity formed by the front sound cavity and the sound guiding channel; a through hole penetrating the housing and disposed at a position on the housing corresponding to the front cavity; and an elastic cover plate arranged on a side of the housing far from the speaker unit and covering the through hole for absorbing vibration energy at a specific frequency. A Young's modulus or strength of the elastic cover plate is smaller than that of the housing.

8 Claims, 3 Drawing Sheets

(56) References Cited

U.S. PATENT DOCUMENTS

2017/0134848 A1\* 5/2017 Shao .................... H04R 1/2834

\* cited by examiner

---- present disclosure
——— related art

SPEAKER BOX

CROSS-REFERENCE TO RELATED APPLICATIONS

This application claims the priority benefit of Chinese Patent Application Ser. No. 201710537088.4 filed on Jul. 4, 2017, the entire content of which is incorporated herein by reference.

FIELD OF THE PRESENT DISCLOSURE

The present disclosure relates to electro-acoustic transducers, more particularly to a housing of a speaker box.

DESCRIPTION OF RELATED ART

With the arrival of mobile internet era, the number of intelligent mobile devices is on the increase. Among the many mobile devices, mobile phones are undoubtedly the most common, most portable mobile terminal devices. At present, the mobile phone functions are extremely diverse, one of which is high quality music function, therefore, the speaker boxes used to play sounds are applied to current smart mobile devices in large quantities.

The speaker box of related art comprises a housing, a speaker unit accommodated in the housing, a through hole penetrating the housing and a cover plate covering the through hole, wherein, the speaker unit comprises a diaphragm for vibration and sound producing, a front sound cavity is formed with the diaphragm and the housing provided spaced apart, the through hole and the diaphragm are provided opposite each other, the speaker box also comprises a sound guiding channel connecting the front sound cavity and the external environment, the front sound cavity and the sound channel form together the front cavity of the speaker box.

However, in the speaker box of related art, the cover plate is a steel plate, because the resonant frequency of the steel plate and the working frequency range of the speaker box are close to each other, when the speaker box works, resonance is easy to be produced in the steel plate, which decreases the frequency response performance of the speaker box and causes distortion, thus affecting the acoustic performance of the speaker box.

Therefore it is necessary to provide an improved speaker box for overcoming the above-mentioned disadvantages.

BRIEF DESCRIPTION OF THE DRAWINGS

Many aspects of the exemplary embodiment can be better understood with reference to the following drawing. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiments. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
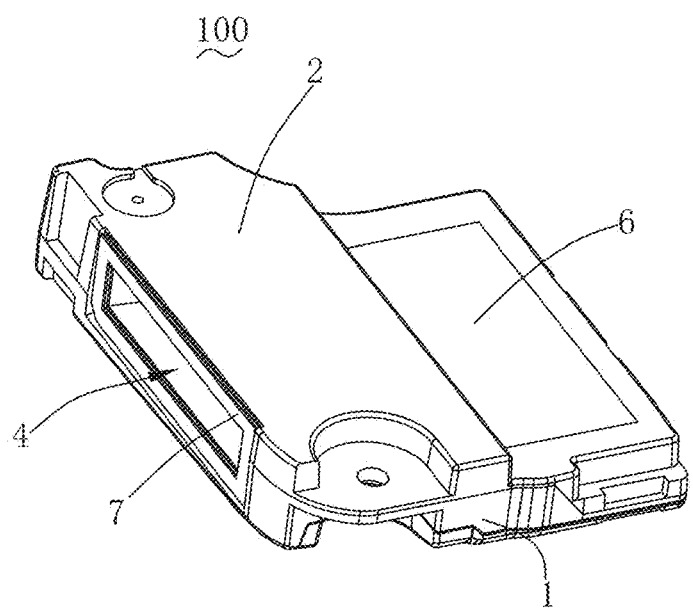
FIG. 1 is an isometric view of a speaker box in accordance with an exemplary embodiment of the present disclosure.
Figure 2:
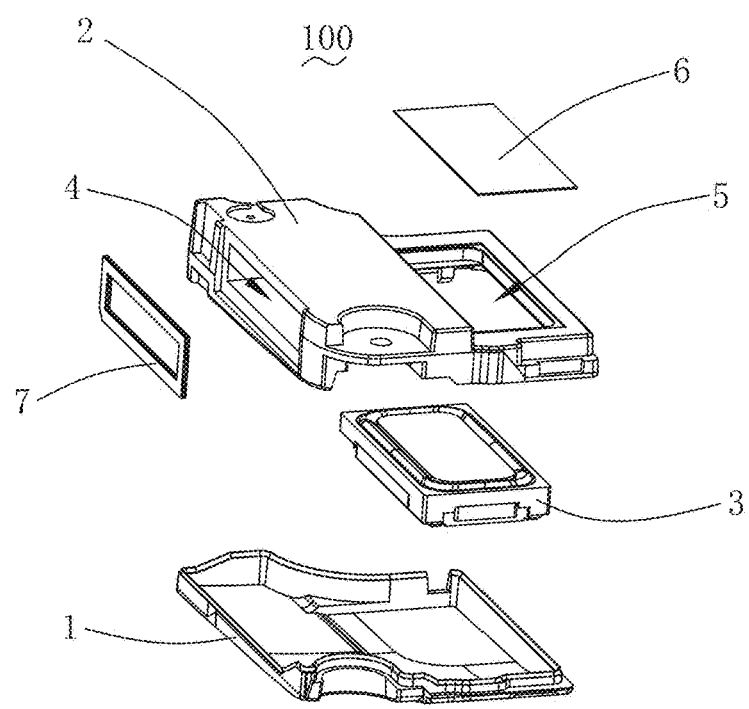
FIG. 2 is an exploded view of the speaker box in FIG. 1.
Figure 3:
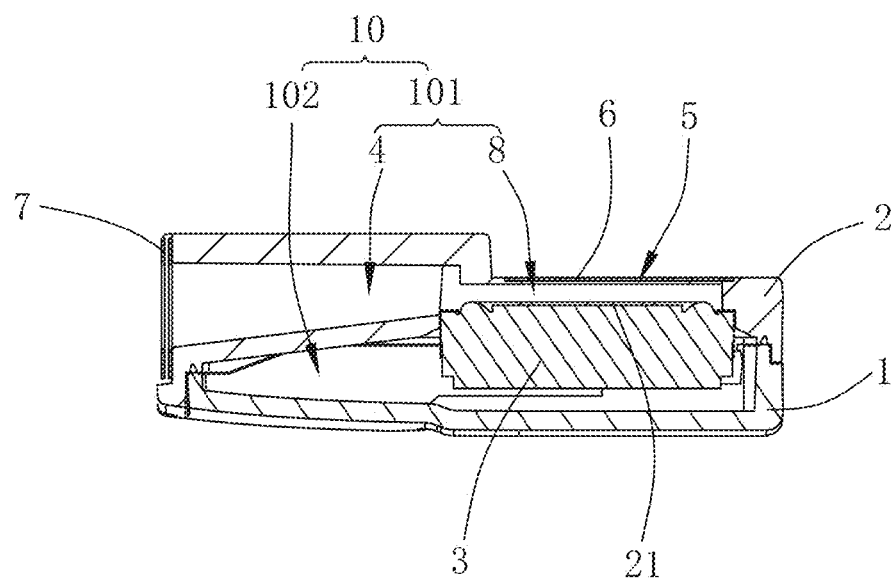
FIG. 3 is a cross-sectional view of the speaker box, taken long line A-A in FIG. 1.

Please refer to FIGS. 1 to 3, the present disclosure provides a speaker box 100 comprising a housing, a speaker unit 3, a sound guiding channel 4, a through hole 5, an elastic cover plate 6 and an adhesive pad 7.

The housing comprises a lower cover 1 and an upper cover 2, wherein the upper cover 2 and the lower cover 1 jointly form an accommodation space 10. The upper cover 2 and the lower cover 1 can be integrated into a whole structure or can be divided into a separate structure.

The speaker unit 3 is fixedly accommodated in the accommodating space 10. The speaker unit 3 and the upper cover 2 are provided with a interval and form jointly a front sound cavity 8; the speaker unit 3, the upper cover 2 and the lower cover 1 form jointly a back cavity 102. The speaker unit 3 includes a diaphragm 21 for vibration and sound producing. Sound generated by the diaphragm 21 transmits from the diaphragm 21 to the external environment through the sound guiding channel 4.

The sound guiding channel 4 is formed in the accommodating space 10, specifically, the sound guiding channel 4 is formed on the upper cover 2. The sound guiding channel 4 connects the front sound cavity 8 with the outside, which aims to form a side sound producing structure.

That is to say, in this embodiment, the speaker unit 3 divides accommodating space 10 into a front cavity 101 and the back cavity 102, in which, the front cavity 101 comprises the front sound cavity 8 and the sound guiding channel 4, which are used for producing sound; the back cavity 102 has the function of improving the low frequency acoustic performance of the speaker box 100.

The through hole 5 is provided as penetrating the housing 2 and is connected with the front sound cavity 8. In the present embodiment, preferably, the through hole 5 and the speaker unit 3 are provided opposite each other.

Of course, the through hole 5 can be provided at the position on the housing corresponding to the front cavity 101.

The elastic cover plate 6 is provided as covering the through hole 5 and is fixed at the upper cover 2, by which the through hole 5 will be completely sealed, the aim of which is to absorb the energy of a particular resonant frequency.

Specifically, the elastic cover plate 6 is provided as embeding into the side of the upper cover 2 far from the speaker unit 3.

In this embodiment, the elastic cover plate 6 and the upper cover are fixedly connected by double-shot molding or hot pressing or pasting or ultrasonic welding.

Of course, in order to improve the structural stability of the speaker box 100, the elastic cover plate 6 and the upper cover 2 can be formed by integrated injection molding.

In this embodiment, the Young's modulus or strength the elastic cover plate 6 is smaller than that of the upper cover 2 or lower cover 1.

In this invention, the elastic cover plate 6 will replace the rigid wall of related technologies, and the elastic cover plate 6 has a resonant frequency, when, through design, the resonant frequency of the elastic cover plate 6 is adjusted to a certain frequency, the elastic cover plate 6 will produce strong vibration near the resonance frequency, when the speaker box 100 produces sounds and the speaker unit 3 vibrates, the air in the front cavity will be compressed and energy will be produced, this energy will drive the elastic cover plate 6 to vibrate, thus the energy in the front cavity will be consumed, preferably, the elastic cover plate 6 vibrates at the resonant frequency, under which condition the vibration intensity will reach the maximum, thus more energy can be consumed; and thus the aim of absorbing energy near the specific frequency can be achieved; in addition, by replacing the rigid wall with the elastic cover plate 6, the medium density in the front cavity 101 can be transmitted to the outside of the front cavity 101, thereby reducing the resonance phenomenon of the speaker box 100 and improving distortion.

Specifically, the purposes mentioned above are achieved by designing the material, area, shape and thickness of the elastic cover plate 6. In this embodiment, the elastic cover plate 6 is made up of material with low Young's modulus or strength, at least below that of the upper cover 2, such as TPU or MCP or silica gel. Then they are fixedly connected by double-shot molding or hot pressing or pasting or ultrasonic welding, forming part of the structure of the front cavity 101, absorbing the energy in the front cavity 101 of the speaker box 100 near resonant peak, and achieving the purpose of decreasing resonance peak, reducing distortion and improving the acoustic performance of the speaker box 100. The elastic cover plate 6 can be designed and adjusted according to the range of the resonant frequency that needs to be absorbed. The specific resonant frequency is just the set range of resonance frequency that needs to be absorbed.

Figure 4:
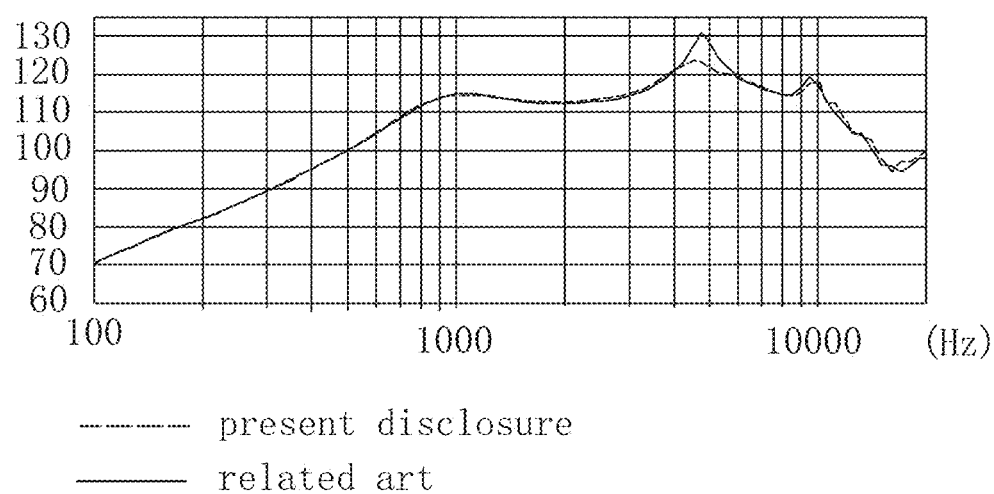
FIG. 4 shows a comparison of frequency response curves between the speaker box of the present disclosure (using an elastic cover plate) and a speaker box (using a rigid wall) of the related art.

Please refer to FIG. 4, a frequency response curve of the speaker box (using an elastic cover plate) of the invention and a speaker box (using a rigid wall) of the related art. As shown in FIG. 4, in the frequency response curve of the speaker box 100 of the invention which uses the elastic cover plate 6, the resonance peak decreases obviously, meaning the resonance phenomenon is reduced.

Figure 5:
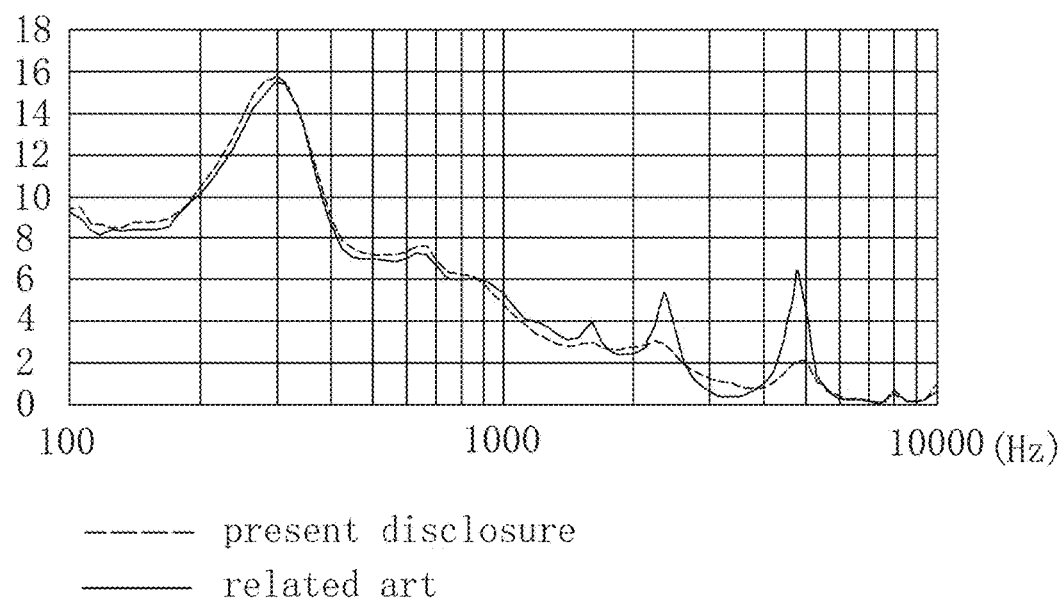
FIG. 5 shows a comparison of total harmonic distortion curves of the speaker box (using an elastic cover plate) of the present disclosure and a speaker box (using a rigid wall) of the related art.

Please refer to FIG. 5, a total harmonic distortion curve of the speaker box (using an elastic cover plate) of the invention and a speaker box (using a rigid wall) of the related art. As shown in FIG. 5, in the total harmonic distortion curve of the speaker box 100 of the invention which uses the elastic cover plate 6, the distortion spike decreases obviously, meaning distortion is reduced.

In the speaker box 100 of the invention, the resonance frequency of the elastic cover plate 6 is 500-15000 Hz.

When the resonance frequency of the elastic cover plate 6 is 500-1500 Hz, the distortion near the low frequency resonance frequency f0 of the speaker box 100 can be reduced, the second time distortion near the corresponding f0/2 can be reduced, the third time distortion near the f0/3 can be reduced, etc.

When the resonance frequency of the elastic cover plate 6 is 1500-3000 Hz, the medium frequency distortion near 2000 Hz of the speaker box 100 can be reduced, the second time distortion near the corresponding 1000 Hz can be reduced, the third time distortion near 667 Hz can be reduced, etc.

When the resonance frequency of the elastic cover plate 6 is 3000-9000 Hz, the distortion near the high frequency resonance peak Fh of the speaker box 100 can be reduced, the second time distortion near the corresponding Fh/2 can be reduced, the third time distortion near Fh/3 can be reduced, etc.

When the resonance frequency of the elastic cover plate 6 is 9000-15000 Hz, the distortion near the high frequency 12000 Hz of the speaker box 100 can be reduced, the second time distortion near the corresponding 6000 Hz can be reduced, the third time distortion near 4000 Hz can be reduced, etc.

Please refer to FIG. 5, according to the experimental data and effects of the curve in the figure, in this embodiment, the resonance frequency of the elastic cover plate 6 is preferably 3000~9000 Hz, under this condition, the distortion spike in total harmonic distortion curve of the speaker box 100 decreases by the most, which means a better effect.

The adhesive pad 7 is provided as affixed to the outside of the sound guiding channel 4, when the speaker box 100 is installed in other applied product, the adhesive pad 7 can, on one hand, bond and fix the loudspeaker box 100 on the applied product and improve its stability, and on the other hand, act as a buffer when the two of them collide.

It needs to be pointed out that, the elastic cover plate 6 is provided to absorb the specific resonance frequency energy of the front cavity 101, therefore, the elastic cover plate 6 is not limited to be provided in the above position, it can also be attached to a position corresponding to the sound guiding channel 4, both of which are feasible.

Compared with related art, in the speaker box of the invention, a through hole penetrating the upper cover is provided on the upper cover corresponding to the front cavity, and the through hole is covered by providing an elastic cover plate, the Young's modulus or strength of the elastic cover plate is smaller than that of the upper cover, which is used to absorb the resonance frequency energy of a specific frequency, thus weakening the resonance effect of the speaker box, reducing its distortion, and thus improving the acoustic performance of the speaker box.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:
1. A speaker box including:
   a housing, the housing comprising an upper cover and a lower cover which jointly form an accommodating space;
   a speaker unit accommodated in the housing, the speaker unit including a diaphragm for vibration and sound producing;
   a front sound cavity formed cooperatively by the diaphragm and the housing;
   a sound guiding channel communicating the front sound cavity with external environment, sound generated by the diaphragm transmitting from the diaphragm to the external environment through the sound guiding channel;

a front cavity formed by the front sound cavity and the sound guiding channel;

a through hole penetrating the housing and disposed at a position on the housing corresponding to the front cavity;

an elastic cover plate arranged on a side of the housing away from the speaker unit and covering the through hole for absorbing vibration energy in the front cavity and generated by the diaphragm at a specific frequency, a Young's modulus or strength of the elastic cover plate being smaller than that of the housing.

2. The speaker box as described in claim 1, wherein the through hole and the speaker unit are opposite to each other.

3. The speaker box as described in claim 2, wherein the elastic cover plate and the upper cover are fixedly connected by double-shot molding or hot pressing or pasting or ultrasonic welding.

4. The speaker box described in claim 2, wherein the elastic cover plate and the upper cover are formed by integrated injection molding.

5. The speaker box as described in claim 1, wherein the specific frequency is 500~15000Hz.

6. The speaker box as described in claim 5, wherein the specific frequency is 3000~9000Hz.

7. The speaker box as described in claim 1, wherein the elastic cover plate is made of TPU or silica gel.

8. The speaker box as described in claim 1 further comprising an adhesive pad affixed to the outside of the sound guiding channel.

* * * * *